United States Patent [19]

McKenna

[11] Patent Number: 4,906,500

[45] Date of Patent: Mar. 6, 1990

[54] BLENDS OF A POLY(ARYL ETHER) AND A POLY(ALKYLENE TEREPHTHALATE) FOR ELECTRICAL DEVICES

[75] Inventor: Lawrence A. McKenna, Flemington, N.J.

[73] Assignee: Amoco Corporation, Chicago, Ill.

[21] Appl. No.: 164,849

[22] Filed: Mar. 7, 1988

Related U.S. Application Data

[63] Continuation-in-part of Ser. No. 893,213, Aug. 5, 1986, abandoned.

[51] Int. Cl.[4] .......................... B32B 15/02; B32B 15/08
[52] U.S. Cl. ........................................ 428/67; 428/379;
525/437; 525/471; 525/534
[58] Field of Search .................. 428/67, 379; 525/397,
525/437, 471, 534

[56] References Cited

U.S. PATENT DOCUMENTS

| 3,742,087 | 6/1973 | Nield | 525/437 |
| 4,024,314 | 5/1977 | Dahl | 428/379 |
| 4,052,365 | 10/1977 | Jones | 525/437 |
| 4,550,140 | 10/1985 | Rimsa | 525/132 |

FOREIGN PATENT DOCUMENTS

| 1190687 | 7/1985 | Canada | 525/397 |
| 59-159847 | 9/1984 | Japan | 525/397 |

*Primary Examiner*—Patricia Short
*Attorney, Agent, or Firm*—William H. Magidson; Ralph C. Medhurst

[57] ABSTRACT

Described herein are blends of a particular poly(aryl ether), a poly(alkylene terephthalate), and a nucleating agent. These blends are suitable for molding into electrical connectors which do not blister when subjected to vapor phase reflow and infrared reflow applications.

4 Claims, No Drawings

BLENDS OF A POLY(ARYL ETHER) AND A POLY(ALKYLENE TEREPHTHALATE) FOR ELECTRICAL DEVICES

REFERENCE TO RELATED APPLICATION

This application is a continuation-in-part of U.S. patent application Ser. No. 893,213, filed Aug. 5, 1986, now abandoned.

FIELD OF THE INVENTION

This invention is directed to blends of a particular poly(aryl ether), a polyalkylene terephthalate), and a nucleating agent for the poly(alkylene terephthalate). These blends are suitable for molding into electrical connectors which do not blister when subjected to vapor phase reflow and infrared reflow applications. More particularly, this invention relates to an electrical conductor assembly for use in switches, connectors, contactors, relays, and the like comprising a polymeric composition shell, said composition shell comprising a particular poly(aryl ether), a poly(alkylene terephthalate), and a nucleating agent for the poly(alkylene terephthalate).

BACKGROUND OF THE INVENTION

Poly(ethylene terephthalate) (PET) can be injection molded into electrical conductors that can withstand rigorous thermal, mechanical, and chemical exposure. However, the crystalline nature of PET results in anisotropic shrinkage which causes warpage, particularly in long (i.e., greater than about 8 inches) connector designs.

Polysulfone, because of its amorphous nature, can be molded virtually warp-free. However, it is prone to chemical attack. Further, due to relatively high moisture absorption and a glass transition temperature of only about 374° F., polysulfone cannot be used to make connectors that will be subjected to vapor phase reflow and infrared reflow applications, such as vapor phase soldering conditions (419°–425° F.) during assembly operations.

Blends of polysulfone and PET combine the best properties of each component and have been used to make warp-resistant connectors that have sufficient chemical resistance to withstand cleaning operations normally used in the electrical/electronic industry. The increased interest in the vapor phase soldering of components surface mounted on printed wiring boards has revealed a shortcoming of said blends of polysulfone and PET. The shortcoming manifests itself as blisters that develop on molded connectors when they are subjected to vapor phase reflow and infrared reflow conditions after exposure to ambient or humid conditions.

THE INVENTION

It has been discovered that the combination of a particular poly(aryl ether) resin, a poly(alkylene terephthalate), and a nucleating agent for the poly(alkylene terephthalate) results in a blend which when formed into an electrical device, such as a connector, has unexpected properties. Such a device does not blister when subjected to vapor phase reflow and infrared reflow conditions, even after conditioning for 7 days at 75% relative humidity at room temperature.

More particularly, this invention relates to an electrical conductor assembly for use in switches, connectors, which does not blister when subjected to vapor phase reflow contactors, relays and the like comprising a composition shell and infrared reflow applications, said composition shell comprising a particular poly(aryl ether), a poly(alkylene terephthalate), and a nucleating agent for the poly(alkylene terephthalate); and an electrical conductive metal core extending at least partially through said shell.

Typically, the metal core comprises a metal conductor imbedded in said shell, and said shell comprises a substantially rigid housing for abuttingly engaging and supporting said core, and, in many cases, said core comprises a pin.

The articles of this invention can be fabricated by the steps of: (1) forming a support member comprising a particular poly(aryl ether), a poly(alkylene terephthalate), and a nucleating agent for the poly(alkylene terephthalate); and (2) positioning an electrical conductor in proximity to said support member.

The Poly(aryl ether) resin

Specifically the poly(aryl ether) resin has a melt flow that is considerably lower than the poly(aryl ether) resin which has been conventionally used in molding electrical devices, such as electrical connectors. The poly(aryl ether) resins of this invention nave a melt flow of between about 20 to 30 g/10 minutes at 343° C. (as measured by ASTM D-1238). Poly(aryl ether) resins which have conventionally been used to mold electrical devices have a melt flow of between 4–9 g/10 minutes.

The poly(aryl ether) resin suitable for blending with the polycarbonate resin and/or poly arylate resin is a linear, thermoplastic polyarylene polyether containing recurring units of the following formula:

$$-O-E-O-E'-$$

wherein E is the residuum of a dihydric phenol, and E' is the residuum of a benzenoid compound having an inert electron withdrawing group in at least one of the positions ortho and para to the valence bonds, both of said residua are valently bonded to the ether oxygens through aromatic carbon atoms. Such aromatic polyethers are included within the class of polyarylene polyester resins described in, for example, U.S. Pat. Nos. 3,264,536 and 4,175,175. It is preferred that the dihydric phenol be a weakly acidic dinuclear phenol such as, for example, the dihydroxyl diphenyl alkanes or the nuclear halogenated derivatives thereof, such as, for example, the 2,2-bis(4-hydroxyphenyl)propane, 1,1-bis(4-hydroxyphenyl)2-phenyl ethane, bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as, for example, ether oxygen (—O—), carbonyl

sulfone

or hydrocarbon residue in which the two phenolic nuclei are joined to the same or different carbon atoms of the residue.

Such dinuclear phenols can be characterized as having the structure:

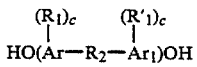

$$HO(Ar-R_2-Ar_1)OH$$ with $(R_1)_c$ and $(R'_1)_c$ substituents wherein Ar and Ar$_1$ are aromatic groups preferably a phenylene group, R$_1$ and R'$_1$ can be the same or different inert substituent groups such as alkyl groups having from 1 to 4 carbons atoms, aryl, halogen atoms, i.e., fluorine, chlorine, bromine or iodine, or alkoxyl radicals having from 1 to 4 carbon atoms, the c's are independently integers having a value of from 0 to 4, inclusive, and R$_2$ is representative of a bond between aromatic carbon atoms as in dihydroxyl-diphenyl, or is a divalent radical, including for example, radicals such as

—O—, —S—, —SO—, —S—S—, —SO$_2$, and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and rings fused to both Ar groups.

Examples of specific dihydric polynuclear phenols including among others: the bis-(hydroxyphenyl) alkanes such as
2,2-bis-(4-hydroxyphenyl)propane,
2,4'-dihydroxydiphenylmethane, bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxy-phenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxy-naphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane,
2,2-bis-(4-hydroxyphenyl)1,1,1,3,3,3,-hexafluoropropane, and the like;
di(hydroxyphenyl)sulfones such as
bis-(4-hydroxyphenyl)sulfone,
2,4'-dihydroxydiphenyl sulfone,
5-chloro-2,4'-dihydroxydiphenyl sulfone,
5'-chloro-4,4'-dihydroxydiphenyl sulfone, and the like;
di(hydroxyphenyl)ethers such as
bis-(4-hydroxyphenyl)ether, the 4,3'-,
4,2'-,2,2'-,2,3-,dihydroxyphenyl ethers,
4,4'-dihydroxyl-2,6-dimethyldiphenyl ether,bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether, and
4,4'-dihydroxyl-3,6-dimethoxydiphenyl ether.

As herein used the E' term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through aromatic ether oxygen atom.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid rings or polynuclear where they are attached to different benzenoid rings, as long as there is an activating electron withdrawing group in the ortho or para position of that benzenoid nuclear. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1% and preferably below 0.5% for best results.

An electron withdrawing group can be employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating group can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine.

(b) divalent groups which can activate displacement of halogens on two different rings,
such as the sulfone group

the carbonyl group

the vinylene group

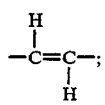

the sulfoxide group

the azo group

the saturated fluorocarbon groups

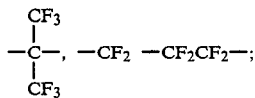

organic phosphine oxides

where $R_3$ is a hydrocarbon group, and the ethylidene group

where A can be hydrogen or halogen.

If desired, the polymers may be made with mixtures of two or more dihalobenzenoid or dinitrobenzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

The poly(aryl ether) resins of this invention are prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt of the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with about stoichiometric quantities of the dihalobenzenoid or dinitrobenzenoid compound.

Additionally, the poly(aryl ether) resins may be prepared by the procedure described in, for example, U.S. Pat. No. 4,176,222 in which a substantially equimolar mixture of at least one bisphenol and at least one dihalobenzenoid are heated at a temperature of from about 100° to about 400° C. with a mixture of sodium carbonate or bicarbonate and a second alkali metal carbonate or bicarbonate having a higher atomic number than that of sodium.

Further, the poly(aryl ether) resins may be prepared by the procedure described in Canadian Patent No. 847,963 wherein the bisphenol and dihalobenzenoid compound are heated in the presence of potassium carbonate using a high boiling solvent such as diphenylsulfone.

Preferred poly(aryl ether) resins of this invention are those prepared using the dihydric polynuclear phenols of the following four types, including the derivatives thereof which are substituted with inert substituent groups

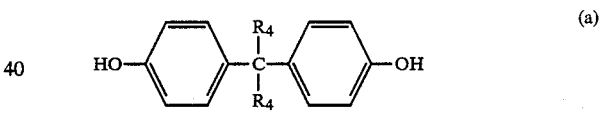

(a)

in which the $R_4$ groups represent independently hydrogen, lower alkyl, aryl and the halogen substituted groups thereof, which can be the same or different;

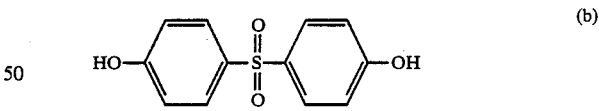

(b)

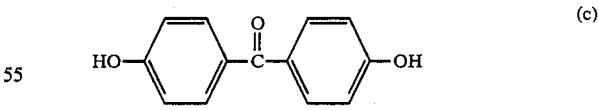

(c)

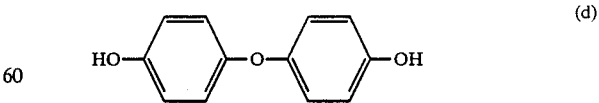

(d)

and substituted derivatives thereof.

It is also contemplated in this invention to use a mixture of two or more different dihydric phenols to accomplish the same ends as above. Thus when referred to above the —E— residuum in the polymer structure can actually be the same or different aromatic residua.

The poly(aryl ether) resins have a melt flow of between about 20 and 30 g/10 minutes at 343° C. (as measured by ASTM D-1238).

The preferred poly(aryl ether)s have repeating units of the formula:

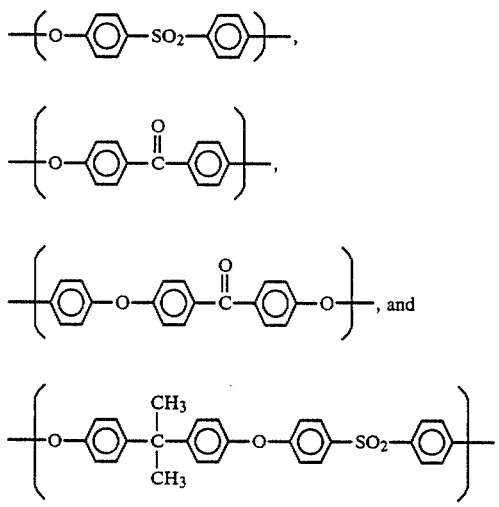

The Poly(alkylene Terephthalate)

The poly(alkylene terephthalate) is selected from poly(ethylene terephthalate) or poly(butylene terephthalate), or combinations thereof.

The poly(alkylene terephthalate) has an intrinsic viscosity of from about 0.4 to about 2.0 dl/g as measured in a 60:40 phenol/tetrachloroethane mixture or similar solvent at 23° C. to 30° C.

The Nucleating Agent

The nucleating agents which are used herein are the conventional agents used to nucleate poly(alkylene terephthalate). These include talc; low density polyethylene; alkali metal salts, such as sodium benzoate and calcium benzoate; alkali metal salts derived from aromatic carboxylic acids, such as sodium o-chlorobenzoate; silicas such as $SiO_2$, inorganic additives such as $TiO_2$, $Al_2O_3$, MgO, $BaSO_4$, and CaO; sodium stearate and calcium stearate; tertiary amine carboxylate salts, and the like.

The poly(aryl ether) is used in amounts of from about 30 to about 70, preferably from about 45 to about 55 weight percent, the poly(alkylene terephthalate) in amounts of from about 70 to about 30, preferably from about 55 to about 45 weight percent, and the nucleating agent in amounts of from 1 to about 3 weight percent.

Other Additives

Other additives which may be used in combination with the blends include mineral fillers such as carbonates including chalk, calcite and dolomite; silicates including mica, wollastonite; silicon dioxide; glass spheres; glass powders; clay; quartz; and the like. Additional additives include fibers such as glass fibers and carbon fibers; pigments, such as titanium dioxide; thermal stabilizers such as zinc oxide; ultraviolet light stabilizers, plasticizers, flame retardants, such as decabromodiphenyloxide, lubricants and the like.

Fabrication

The blends, and one or more optional additives are generally compounded in an extruder. The compounding is carried out at temperatures of from about 200° C. to about 400° C. The compounded materials may be pelletized by conventional techniques.

The compounded material may be shaped into the desired article by conventional molding techniques such as by injection molding, compression molding, thermoforming, or blow molding.

The articles of this invention can be fabricated by the steps of (1) forming a support member comprising a particular poly(aryl ether), a poly(alkylene terephthalate), and a nucleating agent for the poly(alkylene terephthalate); and (2) positioning an electrical conductor in proximity to said support member.

The forming comprises mixing said poly(aryl ether), poly(alkylene terephthalate) and nucleating agent for the poly(alkylene terephthalate). The electrical conductor can be embedded in the polymeric mixture before said molding. The electrical conductor can be positioned adjacent to the support member after said molding. The molding step itself can include abuttingly engaging the conductor against the support member or annularly surrounding the conductor with said support member. The assembly can be fabricated into at least part of a switch, relay, connector, contactor, etc.

EXAMPLES

The following examples serve to give specific illustrations of the practice of this invention but they are not intended in any way to limit the scope of this invention.

The following designations used in the Examples have the following meaning:

Polysulfone P-3703—a polymer having the following repeating unit:

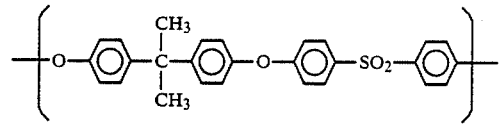

The polymer has a melt flow of 15-20 g/10 minutes at 343° C. as measured by ASTM D-1238 (UDEL P-3703 sold by Amoco Corp.)

Polysulfone P-3900—a polymer having the same repeating unit as Polysulfone P-3703 but with a melt flow of 20-30 g/10 minutes at 343° C. as measured by ASTM D-1738 (UDEL P-3900 sold by Amoco Corp.).

PET I—poly(ethylene terephthalate) with an inherent viscosity of 0.7 dl/g. (Cleartuf 7202 obtained from Goodyear Tire & Rubber Co.)

PET II—poly(ethylene terephthalate) with an inherent viscosity of 1.0 dl/g. (Cleartuf 1002 obtained from Goodyear Tire & Rubber Co.).

Erucyl Stearamide—Kemamide S-221.

Fiberglass—OCF 497 (Owens Corning Fiberglass).

EXAMPLES AND CONTROL

The formulations in Table I were blended in a Brabender Plasticorder at 260° C. The formulated blend was then chopped into pellets. The pelletized product was injection molded at 270° C. into 8⅜ inch long prototype connectors.

The molded connectors were aged at 75% relative humidity (RH) and 73° F. for 7 days. The connectors were then exposed to Fluorimert FC-70 vapors at 419° to 425° F. for 4½ minutes in an HTC Vapor Phase Reflow System.

The results are shown in Table II.

TABLE I

| Example | 1 | 2 | 3 | Control* |
|---|---|---|---|---|
| Polysulfone P-3703 | 33.75 | — | — | — |
| PET I | — | — | 33.75 | — |
| Fiberglass | 22 | 22 | 22 | 22 |
| Decabromodiphenyloxide | 6 | 6 | 6 | 6 |
| Talc | 3 | 3 | 3 | 0 |
| Erucyl Stearamide | 1.5 | 1.5 | 1.5 | 1.5 |
| Polysulfone P-3900 | — | 33.75 | 33.75 | 35.25 |
| PET II | 33.75 | 33.75 | 13 | 35.25 |

*Contains no nucleating agent

TABLE II

Testing of Injection Molded Connectors:
Results After 4½ Min. Exposure to 419°–425° F.
After 7 days @ 75% RH and 73° F.

| Example | 1 | 2 | 3 | 4 |
|---|---|---|---|---|
| | a few Large Blisters | No Blisters | No Blisters | Blisters |

What is claimed is:

1. An electrical conductor assembly for use in switches, connectors, contactors, relays, and the like comprising a polymeric composition shell which does not blister when subjected to vapor phase reflow and infrared reflow applications, said composition shell comprising a poly(aryl ether) having a melt flow of between 20 and 30 g/10 minutes at 343° C., as measured by ASTM D-1238, a poly(alkylene terephthalate) and a nucleating agent for the poly(alkylene terephthalate), and an electrical conductive metal core extending at least partially through said shell.

2. The article of claim 1 wherein said metal core comprises a metal conductor embedded in said shell.

3. The article of claim 1 wherein said shell comprises a substantially rigid housing for abutting engaging and supporting said core.

4. The article of claim 1 wherein said core comprises a pin.

* * * * *

UNITED STATES PATENT AND TRADEMARK OFFICE
CERTIFICATE OF CORRECTION

PATENT NO. : 4,906,500

DATED : March 6, 1990

INVENTOR(S) : Lawrence A. Mckenna

It is certified that error appears in the above-identified patent and that said Letters Patent is hereby corrected as shown below:

| Column | Line | |
|---|---|---|
| 1 | 67-68 | "connectors, which" should read --connectors, contactors, relays and the like comprising a composition shell which-- |
| 2 | 1-2 | "reflow contactors, relays and the like comprising a composition shell and" should read --reflow and-- |
| 3 | 63 | "4,2,-" should read --4,2'- -- |

Signed and Sealed this

Thirtieth Day of July, 1991

Attest:

HARRY F. MANBECK, JR.

Attesting Officer

Commissioner of Patents and Trademarks